US007460268B2

(12) United States Patent
Goto et al.

(10) Patent No.: US 7,460,268 B2
(45) Date of Patent: Dec. 2, 2008

(54) IMAGE PROCESSING DEVICE, IMAGE FORMING DEVICE, IMAGE PROCESSING METHOD, IMAGE PROCESSING PROGRAM, AND RECORDING MEDIUM CONTAINING THE IMAGE PROCESSING PROGRAM RECORDED THEREON

(75) Inventors: Makio Goto, Nara (JP); Masanori Minami, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 1036 days.

(21) Appl. No.: 10/461,070

(22) Filed: Jun. 13, 2003

(65) Prior Publication Data
US 2004/0001228 A1 Jan. 1, 2004

(30) Foreign Application Priority Data
Jun. 14, 2002 (JP) ............................. 2002-174851

(51) Int. Cl.
*H04N 1/60* (2006.01)
*H04N 1/46* (2006.01)
*G06K 15/00* (2006.01)
*G06K 9/00* (2006.01)
*G03F 3/08* (2006.01)

(52) U.S. Cl. .................... 358/1.9; 358/2.1; 358/302; 358/3.01; 358/534; 358/535; 358/536; 358/519; 358/521; 358/523; 358/538; 358/3.23; 382/162; 382/167

(58) Field of Classification Search ............... 358/1.9, 358/406, 504–505, 523, 518, 519–520, 515, 358/534–535, 448, 453, 296, 302, 3.1, 3.16, 358/3.01, 3.06, 3.13, 3.17, 3.19, 536, 521, 358/538, 2.1, 3.23; 382/274–275, 162, 167, 382/286, 319; 355/38; 347/232, 251; 399/45

See application file for complete search history.

(56) References Cited

U.S. PATENT DOCUMENTS 5,515,096 A * 5/1996 Fujimoto .................... 347/232

(Continued)

FOREIGN PATENT DOCUMENTS

JP 60-220660 11/1985

(Continued)

OTHER PUBLICATIONS

Color Science Handbook, New Edition, edited by the Color Science Association of Japan, Tokyo University Press, pp. 1137-1149, Jun. 1998.

(Continued)

*Primary Examiner*—Edward L Coles
*Assistant Examiner*—Charlotte M Baker
(74) *Attorney, Agent, or Firm*—Edwards Angell Palmer & Dodge LLP; David G. Conlin; William J. Daley, Jr.

(57) ABSTRACT

The present invention provides an image processing device which can reduce a storage capacity and perform color correction in accordance with the types of image. The image processing device of the present invention has an input correction section 6 including: input color correction section 24 for, using a matrix coefficient, correcting strength of signals for color components in image data of a supplied image; a matrix coefficient storage section 26 for storing a plurality of matrix coefficients in accordance with types of image; and control section 25 for reading a matrix coefficient corresponding to the type of a supplied image out of the matrix coefficients stored in the matrix coefficient storage section 26 and setting the matrix coefficient that has been read in the input color correction section 24.

15 Claims, 5 Drawing Sheets

U.S. PATENT DOCUMENTS

| | | | | |
|---|---|---|---|---|
| 5,805,295 | A | * | 9/1998 | Mikami ............... 358/3.1 |
| 5,828,461 | A | * | 10/1998 | Kubo et al. ............ 358/296 |
| 5,982,947 | A | * | 11/1999 | Hayashi ............... 382/274 |
| 6,008,912 | A | * | 12/1999 | Sato et al. ............. 358/518 |
| 6,330,085 | B1 | * | 12/2001 | Yamamoto et al. ...... 358/538 |
| 7,251,060 | B2 | * | 7/2007 | Tonami et al. ......... 358/3.16 |

FOREIGN PATENT DOCUMENTS

| | | |
|---|---|---|
| JP | 03-076470 | 4/1991 |
| JP | 04-291591 | 10/1992 |
| JP | 09-193477 | 7/1997 |
| JP | 2000-324348 | 11/2000 |
| JP | P3133409 | 2/2001 |
| JP | 2001-157072 | 6/2001 |
| JP | 2002-218232 | 8/2002 |

OTHER PUBLICATIONS

Journal of the Imaging Society of Japan, vol. 4, No. 37, pp. 555-559, 1998.

* cited by examiner

IMAGE PROCESSING DEVICE, IMAGE FORMING DEVICE, IMAGE PROCESSING METHOD, IMAGE PROCESSING PROGRAM, AND RECORDING MEDIUM CONTAINING THE IMAGE PROCESSING PROGRAM RECORDED THEREON

FIELD OF THE INVENTION

The present invention relates to an image processing device, an image forming device, an image processing method, image processing program each of which provides image processing to an original image composed of text, screen dots, photograph, etc., and a recording medium containing the image processing program recorded thereon.

BACKGROUND OF THE INVENTION

In recent years, an electro photographic digital color copying machine, an ink-jet or thermal transfer color printer, etc. (image forming device) have been widely spread due to rapidly developed digitalization of office automation equipment and increasing demand for color image output.

In these image forming device, image information inputted from an image input device such as digital camera and scanner, or image information created on a computer are outputted through an image output device.

Such image forming device needs to output images with constantly stable color reproduction, corresponding to image information inputted. In the realization of such images, color correction in the digital image processing technology plays an important role. Note that color correction processing herein refers to all of the following operations: correction of color signals that would be inappropriate signals when outputted directly; conversion of color signals for a change in color itself (color conversion); and transformation of color signal's coordinates without any change in color itself.

As to a method for color correction, many proposals have been conventionally made including color coordinate transformation for converting input image data into uniform color space data. Such a method includes a Look-Up Table (hereinafter referred to as LUT) method such as direct conversion and three-dimensional interpolation, and masking method, which are described in "Color Science Handbook New Edition" (Edited by The Color Science Association of Japan; published by Tokyo University Press p. 1137-1149) and Journal of Image Society of Japan (No. 4 (1998), Vol.37, p.555-559).

Such color correction is carried out in an image processing device of the image forming device. Examples of color correction by the image processing device include color correction of input from an image input device such as scanner (pre-process of color correction), and color conversion which is proper processing to provide image formation of image data inputted from the image input device onto a recording material such as paper by electro photographic or ink-jet image output device (post-process of color correction).

The color correction (pre-process and post-process of color correction) will be explained below.

First, the pre-process of color correction will be explained.

Usually, image data inputted from an image input device such as scanner are data for a color space of the image input device.

Therefore, the image processing device must provide a removal of various distortions caused by an illumination system, imaging system, and capturing system, for the image data inputted from the image input device (pre-color correction).

For example, 3×3 matrix coefficient obtained by the least-square method is used to remove the distortions in such a pre-process of color correction.

Next, the post-process of color correction will be explained.

The post-process of color correction is a conversion of RGB signals into CMY(K) signals after removing turbidity based on spectral characteristic of CMY (C: Cyan, M: Magenta, and Y: Yellow) colors, including unnecessary absorption elements when the RGB signals are expressed using CMY(K) colors, in order to reproduce the original colors faithfully.

For example, Japanese Unexamined Patent Publication No. 220660/1985 (Tokukaisho 60-220660; published on Nov. 5, 1985; conventional art (A)) discloses a color correction process to minimize a color difference between an original image and its reproduced image, as a post-process of color correction.

In this color correcting method, firstly, color-separated signals $R_0$, $G_0$, and $B_0$ are identified for each pixel, which area they belong to among predetermined plural areas in a color separation signal space. Then, color correcting coefficient matrices are obtained in accordance with the result of the identification, and correcting color-separated signals $R_1$, $G_1$, and $B_1$ are outputted using color correcting coefficient matrices.

This allows color correction corresponding to the area in the color-separated signal space, i.e. the value of supplied color-separated signals $R_0$, $G_0$, and $B_0$. Consequently, a color difference between an original image and its reproduced image can be minimized, thereby improving an overall color correction accuracy.

Note that, the color correcting coefficient matrices are predetermined in accordance with the area of the color-separated signal space, and prepared in plural number.

Further, Japanese Patent No. 3133409 (conventional art (B); granted on Nov. 24, 2000; Japanese Unexamined Patent Publication No. 48888/1993 (Tokukaihei 5-48888; published on Feb. 26, 1993) discloses a digital color copying device which provides adjustment of the same fine hue adjacently positioned, as a post-process of color correction.

The digital color copying device is provided with a plurality of color conversion tables in accordance with the hues of an original as well as selects a proper color conversion table in accordance with the judging result of the hue of the original. This makes it possible to improve the reproducibility of a color original in which the same fine hue is adjacently positioned.

Japanese Unexamined Patent Publication No. 193477/1997 (Tokukaihei 9-193477; published on Jul. 29, 1997; conventional art (C)) discloses a printing device which provides color correction to each object of an printed image, as a post-stage correction process.

In the printing device, the type of each object (graphics, text, photograph) is judged with reference to printed data described in page description language (PDL), and color correction is carried out using a color correction table corresponding to the type of judged object. This makes it possible to provide color correction for each object, thereby obtaining an appropriate printed image.

Incidentally, to the image processing device which provides such color correction, image data are inputted from the image input device, as described above. Namely, the image input device scans images from an original and outputs them as image data to the image processing device.

Input characteristics of this image input device does not match human visual characteristics. Therefore, depending on the type of image (original), the image input device might scan an image with colors different from those by human visual perception. For this reason, some type of image needs correction of supplied signals in the image processing device.

However, neither the conventional art (A) nor (B) provides color correction (pre-process of color correction) in accordance with the types of image (e.g. text, screen dots, photograph, etc.) in the relation between the image input device and image processing device.

This cannot provide color correction in accordance with the types of image different in color correction accuracy.

Also, the conventional art (C) needs a plurality of color correction tables in accordance with the types of image to perform color correction in accordance with the types of image. This causes complication of its constitution and a necessity of increasing a storage capacity. This results in a higher cost for manufacturing the image processing device.

Further, it takes a lot of trouble to create such a color correction table. Accordingly, if a plurality of color correction tables is used to provide color correction depending on plural types of image, it is necessary to increase a step of creating the color correction tables.

SUMMARY OF THE INVENTION

An object of the present invention is to provide an image processing device, an image forming device, image processing method, image processing program each of which can reduce a storage capacity and perform color correction in accordance with the types of image, and a recording medium having the image processing program recorded thereon.

In order to achieve the above object, an image processing device of the present invention includes:

input color correcting means for, using a matrix coefficient, performing input color correction for correcting strength of signals for color components in image data of a supplied image;

matrix coefficient storing means for storing a plurality of matrix coefficients in accordance with types of image; and control means for reading a matrix coefficient corresponding to a type of a supplied image out of the matrix coefficients stored in the matrix coefficient storing means and setting the matrix coefficient that has been read in the input color correcting means.

Usually, the characteristics of image data supplied to the image processing device does not match human visual characteristics. Therefore, depending on the type of image, the image processing device distinguishes colors on the image differently from colors perceived by human eyes. For this reason, it is necessary to correct image data in accordance with the types of original image.

However, according to the above arrangement, it is possible to change the matrix coefficient in accordance with the types of image, regardless of the value of signals for color components in image data of a supplied image. Therefore, it is possible to perform suitable input color correction in accordance with the types of image.

Further, input color correction is performed using a matrix coefficient having a small storage capacity, so that, for example, it is not necessary to use an LUT (Look-Up Table) having a large storage capacity for each type of image when color conversion (process for converting color components into different color components) is performed later. Therefore it is possible to reduce a storage capacity.

Further, the image forming device of the present invention includes the above-described image processing device and an image input device which scans images from an original and supplies the scanned images to the image processing device.

According to the above arrangement, the image processing device the image processing device can perform suitable input color correction in accordance with the types of image with respect to image data of images supplied from the image input device. Therefore, it is possible to provide an image forming device which can form images with an excellent image quality.

Further, input color correction is performed using a matrix coefficient having a small storage capacity, so that, for example, it is not necessary to use an LUT (Look-Up Table) having a large storage capacity for each type of image when color conversion (process for converting color components into different color components) is performed after the input color correction in the image processing device. Therefore it is possible to reduce a storage capacity in the image forming device.

In order to the above object, an image processing method of the present invention includes the steps of:

selecting a matrix coefficient corresponding to a type of an supplied image from among a plurality of matrix coefficients; and using the matrix coefficient that has been selected, performing input color correction for correcting strength of signals for color components in image data of the supplied image.

According to the above arrangement, it is possible to change matrix coefficients in accordance with the type of image, regardless of the value of the signals for color components in the image data of the supplied image. Therefore, it is possible to perform suitable input color correction depending on the type of image.

Further, input color correction is performed using a matrix coefficient having a small storage capacity, so that, for example, it is not necessary to use an LUT (Look-Up Table) having a large storage capacity for each type of image when color conversion (process for converting color components into different color components) is performed later. Therefore it is possible to reduce a storage capacity.

An image processing program of the present invention is arranged to cause a computer to execute the foregoing image processing method.

According to the above arrangement, it is possible to provide the foregoing image processing method to users by loading the image processing program into a computer system.

An recording medium of the present invention is arranged to record an image processing program which causes a computer to execute the image processing method.

According to the above arrangement, it is possible to provide the foregoing image processing method to users by loading a program recorded in the foregoing recording medium into a computer system.

For a fuller understanding of the nature and advantages of the invention, reference should be made to the ensuing detailed description taken in conjunction with the accompanying drawings.

DESCRIPTION OF THE EMBODIMENTS

First Embodiment

One embodiment of the present invention will be explained as follows with reference to FIGS. 1 to 3.

Figure 1:
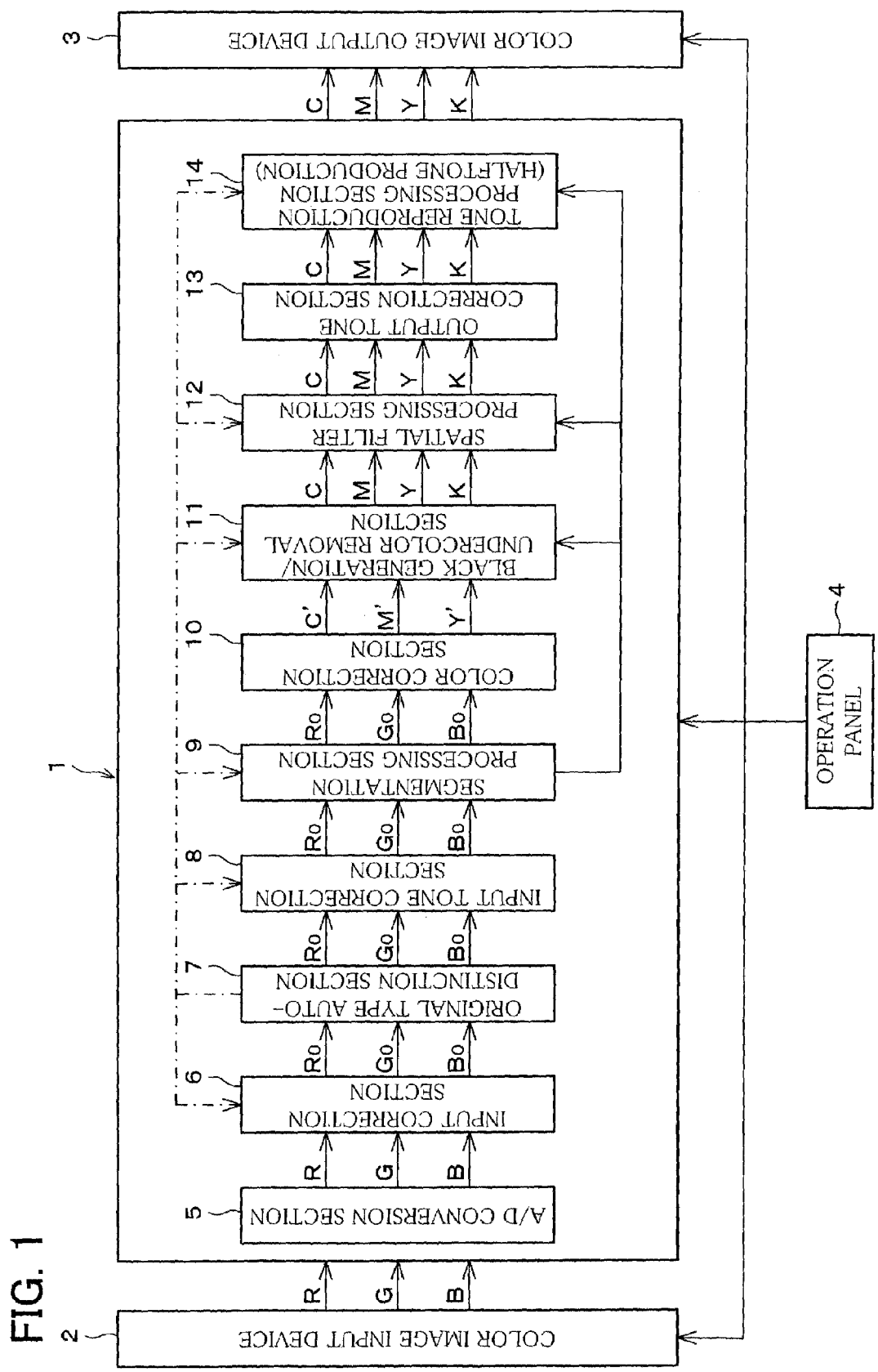
FIG. 1 is a block diagram showing a constitution of relevant part in a digital color copying machine according to one embodiment of the present invention.

FIG. 1 shows a constitution of a relevant part in a digital color copying machine (image forming device) according to the present embodiment. This digital color copying machine employs an electro photographic process.

As shown in FIG. 1, this digital color copying machine includes a color image input device (image input device) 2, an image processing device 1, and a color image output device (image output device) 3.

The color image input device 2 includes a scanner section being provided with, for example, a CCD (Charge Coupled Device) which scans an original. The color image input device 2 scans a reflected light image of an original as analog signals of R, G, B (R: red, G: green, and B: blue) with the CCD and supplies it to the image processing device 1.

The image processing device 1 performs predetermined image processing with respect to an original image (image) that has been scanned by the color image input device 2. The constitution of the image processing device 1 and the image processing will be explained later.

The color image output device 3 forms color images on a sheet of paper (recording material) in accordance with signals outputted from the image processing device 1. For example, the color image output device 3 has at least a photoreceptor (not shown); an exposure section for exposing the photoreceptor in accordance with image signals of plural colors, inputted from the image processing device 1; a developing section for developing an electrostatic latent image, which is formed on a surface of the photoconductor by exposure, with toners of plural colors; and a transferring section for transferring developed images to a sheet of paper.

The following will explain the constitution of the image processing device 1.

The image processing device 1 includes an A/D (Analog/Digital) conversion section 5, an input correction section 6, an original type auto-distinction section (original type distinction section) 7, an input tone correction section 8, a segmentation processing section 9, a color correction section (color converting means) 10, a black generation/under color removal section 11, a spatial filter processing section 12, an output tone correction section 13, and a tone reproduction processing section 14.

The A/D conversion section 5 converts analog R, G, B signals, which are read by the color image input device 2 and supplied to the image processing device 1, into digital R, G, B signals (RGB signals).

The input correction section 6 performs correction processes including shading correction, line delay adjustment, MTF correction, and input color correction (color correction), with respect to the RGB signals supplied from the A/D conversion section 5, so as to output $R_0$, $G_0$, $B_0$ signals. The constitution of the input correction section 6 and the above corrections will be explained later.

The original type auto-distinction section 7 carries out complimentary inversion of the RGB signals (reflectivity signals of R, G, B) corrected in the input correction section 6 to a C (Cyan), M (Magenta), Y (Yellow) signals and converts the RGB signals into a density signals. Thus, conversion into such density signals provide manageable signals for an image processing system adopted for the image processing device 1.

Further, the original type auto-distinction section 7 automatically distinguishes the type of supplied original image, for example, between text, photograph (screened halftone image and photo image), and a mixture of text and photograph.

For a method for distinguishing the type of supplied original image in the original type auto-distinction section 7, it is possible to employ, for example, a method previously proposed by the present applicant (Japanese Unexamined Patent Publication No. 2002-218232; Tokukai 2002-218232; published on Aug. 2, 2002)).

This method begins with pre-scanning prior to a real scanning for scanning an original. During this pre-scanning, using a density histogram created in accordance with $R_0$, $G_0$, $B_0$ signals supplied to the original type auto-distinction section 7 obtained are the number of sections of low degree density which is smaller than a predetermined threshold value, a density section of a first maximum degree value, a density section of a second maximum degree value which is a maximum degree value in density sections other than the density sections adjacent to the density section of the first maximum degree value. Then, the proportion of the first maximum degree value in the total number of pixels and the proportion of (a first maximum degree value—a second maximum degree value) in the total number of pixels are calculated. By comparing these calculated values with a predetermined threshold value, the type of original image is categorized as any one of text, photograph, and text/photograph.

In the case where the original image is judged as photograph, its image data inputted to the original type auto-distinction section 7 is digitized, a mask composed of a plurality of pixels including an interested pixel, and a sum of points of change from "0" to "1" and "1" to "0" in the main scanning direction and the sub-scanning direction, respectively, is obtained (For speeding up, only points of change in the main scanning direction may be obtained). Then, it may be judged in such a manner that the type of original image is screened halftone image (screen dots) if the sum is not less than a predetermined threshold value, and it is photo image if the sum is below the predetermined threshold value. This is realized by applying the characteristic of screened halftone image that the fluctuation of image signals in local areas is wide.

After the type of original image has been distinguished in such a manner, a distinction result, i.e. an image type distinguishing signal (image type signal) corresponding to the type of original image is supplied to the input correction section 6, the input tone correction section 8, the segmentation processing section 9, the black generation/under color removal section 11, the spatial filter processing section 12, and the tone reproduction processing section 14. The supplied image type distinguishing signal is used during real scanning.

Here, as described previously, in the case where the type of original image is distinguished during the pre-scanning, the input correction section 6 during the pre-scanning distinguishes the type of original as default setting. When the distinction result (image type distinguishing signal) is supplied to the input correction section 6, the input correction section 6's setting is changed from the default setting to a setting corresponding to the distinguished type of the original image.

This allows later-performed real scanning to provide most suitable color correction processes (image processing) such as input color correction and color conversion, which will be described later, in accordance with the types of original image.

Note that, during the real scanning, the $R_0$, $G_0$, $B_0$ signals are directly supplied to the input tone correction section 8.

The input tone correction section 8 controls a color balance with respect to the $R_0$, $G_0$, $B_0$ signals from which various distortions have been removed by shading correction in the input correction section 6, as well as provides image quality control process including removal of under color density and control of a contrast ratio, in accordance with the image type distinguishing signal from the original type auto-distinction section 7.

The segmentation processing section 9 segments pixels in the supplied image into text area, screen dots area, and photograph area in accordance with the $R_0$, $G_0$, $B_0$ signals, to which image quality control process is provided, supplied from the input tone correction section 8.

Further, the segmentation processing section 9 supplies area identification signals indicating which area each of the pixels belong to, to the black generation/under color removal section 11, the spatial filter processing section 12, and the tone reproduction processing section 14, as well as outputs input signals supplied from the input tone correction section 8 directly to the color correction section 10 at a subsequent stage.

The color correction section 10 performs color conversion for converting the $R_0$, $G_0$, $B_0$ signals (first image data) composed of supplied three colors, R, G, B (first color system) into C'M'Y' signals (second image data) composed of three colors, C, M, Y (second color system), which are complementary colors of the colors R, G, B. This allows colors (R, G, B) scanned by the color image input device 2 to be converted into colors (C, M, Y) for forming an image with toner, ink or the like on a recording material.

For the realization of faithful color reproduction, the color correction section 10 also performs removal of turbidity based on the spectral characteristic of CMY colors, including unnecessary absorption elements.

As the process in the color correction section 10 adopted is direct conversion which is conventionally used; look-up table method such as two-dimensional interpolation and three-dimensional interpolation, which are disclosed in Japanese Unexamined Patent Publication No. 157072/2001 (Tokukai 2001-157072; published on Jun. 8, 2001), and others; masking method, or bit-rounding direct conversion, which is disclosed in Japanese Unexamined Patent Publication No. 324348/2000 (Tokukai 2000-324348; published on Nov. 24, 2000), and others.

The black generation/under color removal section 11 performs black generation for generating a black (K) signal from the C'M'Y' signals composed of three colors, C, M, Y, which are supplied from the color correction section 10, and performs under color removal for removing the K signal obtained by the black generation from the C'M'Y' signals, so as to generate new CMY signals. In other words, the black generation/under color removal section 11 performs black generation and under color removal for converting a three-color signals of C, M, Y (C'M'Y' signals) into a four-color signal of C, M, Y, K (CMYK signals).

An example method of the black generation is generally black generation by skeleton black. In this method, the black generation and under color removal can be expressed by the following equation (1):

$$\begin{cases} K = f\{\min(C', M', Y')\} \\ C = C' - \alpha K \\ M = M' - \alpha K \\ Y = Y' - \alpha K \end{cases} \quad (1)$$

where input/output characteristic of skeleton curve is y=f(x), inputted data is C', M', Y', outputted data is C, M, Y, K, and UCR (Under Color Removal) rate is $\alpha (0<\alpha<1)$.

The spatial filter processing section 12 performs spatial filter processing by a digital filter in accordance with the area identification signal, for the image data of the CMYK signals supplied from the black generation/undercolor removal section 11. This can correct a spatial frequency characteristic and prevent a blurred output image and deterioration in graininess.

For example, as to the area segmented as text area by the segmentation processing section 9, the amount of enhancement in high frequency is increased by spatial filter processing (sharpness enhancement processing) by the spatial filter processing section 12, so as to enhance the reproducibility of especially black characters or colored characters. Simultaneously, in the tone reproduction processing section 14 selected is binarization or multi-thresholding with a high resolution screen suitable for the high frequency reproduction.

Further, as to the area segmented as screen dots area by the segmentation processing section 9, the spatial filter processing section 12 provides low-pass filter processing for eliminating input screen dots components.

The output tone correction section 13 provides output tone correction for converting a signal such as density signal into an area ratio of screen dots which is attributes of the color image output device 3.

The tone reproduction processing section 14 provides predetermined processing to the image data of the CMYK signals supplied in accordance with the area identification signal from the output tone correction section 13. Specifically, the tone reproduction processing section 14 provides tone reproduction process (halftone production) for dividing an image into pixels in the end and processing so that the respective tones of the pixels can be reproduced. Note that, as to the area segmented as photograph area by the segmentation processing section 9, binarization or multi-thresholding is performed with a screen conscious of tone reproducibility.

The image data that has been subjected the foregoing processes are stored temporarily in storage means and read out at a predetermined timing to be supplied to the color image output device 3. Note that, the above processes are controlled by a CPU (Central Processing Unit) not shown.

Note that, examples of the color image output device 3, which outputs image data onto a recording material (e.g. paper), includes, but are not limited to, electro photographic or ink-jet image output devices and others.

Further, the original type auto-distinction section 7 is not always provided in the image processing device 1. Specifically, it may be arranged so that an operator selects an image mode indicating the type of original image on an operation panel 4 provided to this digital color copying machine. In this case, the operator's selection of the image mode produces an image type distinguishing signal, which is supplied to the image processing device 1. Examples of the image mode include text image mode, screened halftone image mode, photo image mode, text/photo image mode, etc. For example, this operation panel 4 may consist of a display section not shown, such as liquid crystal panel, and setting buttons not shown.

Alternatively, the distinction process for the type of original image by the original type auto-distinction section 7 may be arranged so as to be carried out during a time other than the time of pre-scanning. For example, the RGB signals outputted from the A/D conversion section 5 are stored in an image memory not shown, as well as the original type auto-distinction section 7 distinguishes the type of original image. Then, its distinction result (image type distinguishing signal) is supplied to the input correction section 6, and the setting in the input correction section 6 is changed to a setting in accordance with the distinguished type of the original image. Thereafter, the image data are read out from the image memory and subjected to the foregoing processes following the process in the input correction section 6. Note that, in this case, pre-scanning is unnecessary.

The following will explain the constitution of the input correction section 6, which is a characteristic constitution of the digital color copying machine according to the present embodiment, and input color correction process in the input correction section 6.

First, the constitution of the input correction section 6 will be explained with reference to FIG. 2.

Figure 2:
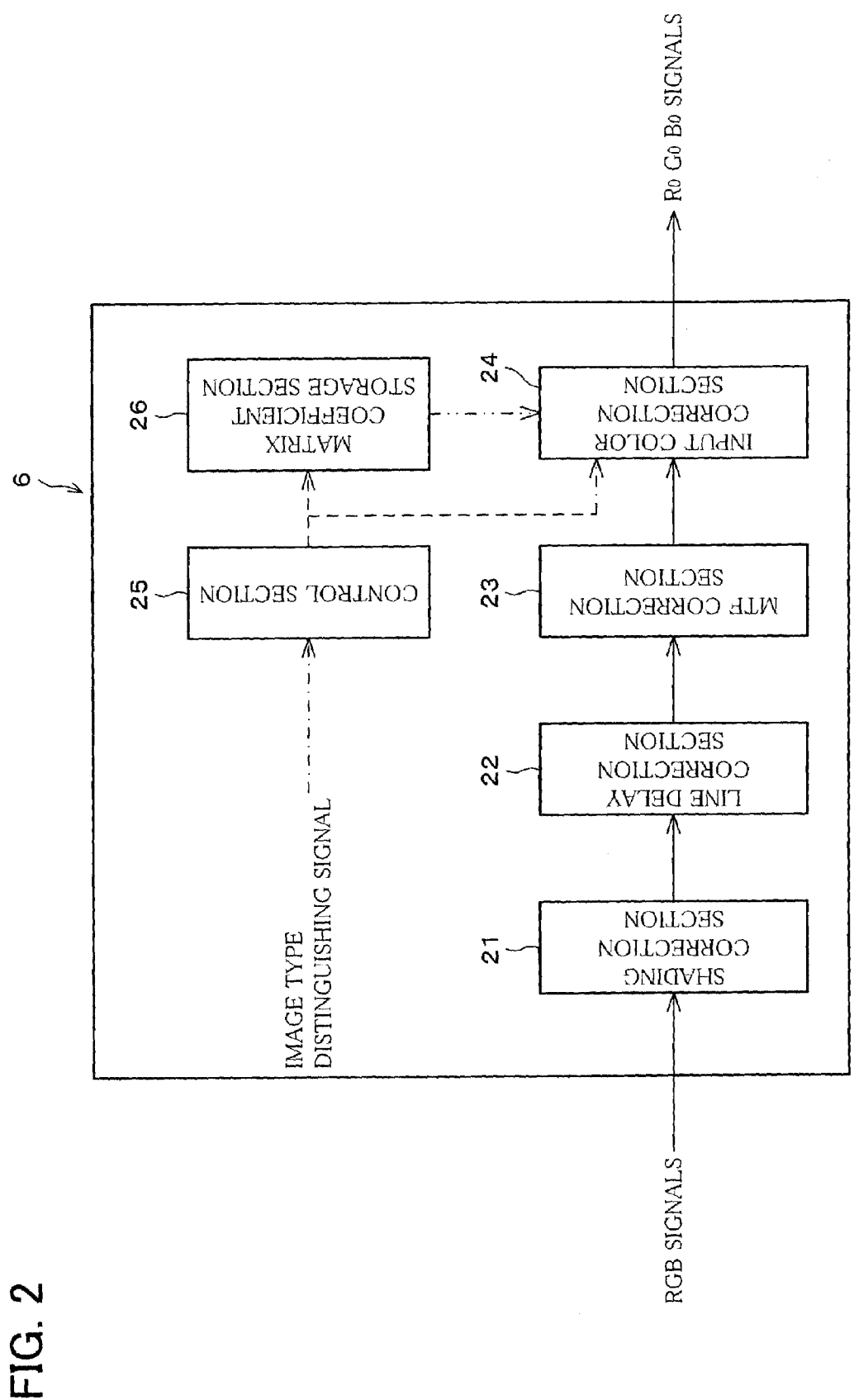
FIG. 2 is a block diagram showing a constitution of an input correction section.

The input correction section 6, as shown in FIG. 2, includes a shading correction section 21, a line delay correction section 22, an MTF (Modulation Transfer Function) correction section 23, an input color correction section (input color correcting means) 24, a control section (control means) 25, and a matrix coefficient storage section (matrix coefficient storing means) 26.

The shading correction section 21 provides a process of removing various distortions caused by an illumination system, imaging system, and capturing system of the color image input device 2, with respect to digital RGB signals sent from the A/D conversion section 5.

The line delay correction section 22 removes line gaps between R, G, and B in the CCD and converts the RGB signals into data without line gaps. More specifically, the line delay correction section 22 corrects displacement caused by a differently placed CCD which is provided with the respective filters for R, G, B.

The MTF correction section 23 recovers the deterioration of MTF (Modulation Transfer Function).

Usually, the image signal outputted from the CCD suffers from the deterioration of MTF due to optical components such as lens and mirror, aperture's area ratio on the light-receiving surface of the CCD, transfer efficiency and after image, storage effect and lacking in uniformity of scanning by physical scanning. This deterioration of MTF causes the scanned image to be blurred.

However, proper filter processing (enhancement process) by the MTF correction section 23 can recover the blur caused by the deterioration of MTF, thereby improving the image quality.

The input color correction section 24 performs input color correction for ideally carrying out the exchange of image data and the image processing. That is, the input color correction section 24 corrects the strength of signals for color components (RGB signals) in the image data supplied to the image processing device 1.

More specifically, the input color correction section 24 converts input signals supplied from the MTF correction section 23 using 3×3 matrix coefficient (color correction matrix coefficient) obtained by the least-square method or other method, as shown in the following equation (2):

$$\begin{pmatrix} R_0 \\ G_0 \\ B_0 \end{pmatrix} = \begin{pmatrix} M_{11} & M_{12} & M_{13} \\ M_{21} & M_{22} & M_{23} \\ M_{31} & M_{32} & M_{33} \end{pmatrix} = \begin{pmatrix} R_{in} \\ G_{in} \\ B_{in} \end{pmatrix} \quad (2)$$

Here, $R_{in}$, $G_{in}$, $B_{in}$ are input signals, $M_{ij}$ (i, j=1-3) is matrix coefficient, and $R_0$, $G_0$, $B_0$ are output signals.

The matrix coefficient storage section 26 stores a plurality of 3×3 matrix coefficients therein. These 3×3 matrix coefficients correspond to the types of original images, respectively. That is, the matrix coefficient storage section 26 stores matrix coefficients in accordance with the types of original image therein.

The control section 25 controls the input color correction section 24 and matrix coefficient storage section 26. The control section 25 receives the image type distinguishing signal outputted from the original type auto-distinction section 7 or the operation panel 4. For example, in response to receipt of the image type distinguishing signal, the control section 25 controls to perform input color correction using a matrix coefficient preset in the input color correction section 24 or a matrix coefficient read out from the matrix coefficient storage section 26 by the control section 25 and set in the input color correction section 24.

Usually, the characteristic of the image data scanned by the color image input device 2 and inputted to the image processing device 1 does not match human visual characteristics. Therefore, depending on the type of original image, the color processing device 1 distinguishes colors on the original image differently from colors perceived by human eyes. For this reason, it is necessary to correct image data in accordance with the types of original image. Here, the type of original image includes any one of text image, screened halftone image (screen dots), and photo image (photograph), or mixture of these images.

However, as described previously, the input correction section 6 includes the input color correction section 24 which performs input color correction for correcting the strength of signals for color components in the supplied image data using a matrix coefficient, the matrix coefficient storage section 26 which stores therein a plurality of matrix coefficients in accordance with the types of original image, the control section 25 which reads a matrix coefficient corresponding to the type of supplied original image out of matrix coefficients stored in the matrix coefficient storage section 26 and set the matrix coefficient that has been read in the input color correction section 24.

This makes it possible to change the matrix coefficient for use in the input color correction section 24 in accordance with the types of original image, regardless of the value of signals for color components (RGB signals) in the image data of the supplied original image. Therefore, it is possible to perform suitable input color correction in accordance with the types of original image.

Next, the following will explain more specifically the input color correction using the above matrix coefficient in the input color correction section 24.

In the input color correction section 24, any one of the matrix coefficients stored in the matrix coefficient storage section 26 is preset as a default. Here, it is assumed that a matrix coefficient corresponding to screened halftone is preset in the input color correction section 24.

For example, in the case where the type of original image is screened halftone image, that is, in response to receipt of the image type distinguishing signal corresponding to the screened halftone image, the control section 25 controls the input color correction section 24 so that the input color correction section 24 performs input color correction using the matrix coefficient set therein. The input color correction at this time is expressed by. the following equation (3):

$$\begin{pmatrix} R_0 \\ G_0 \\ B_0 \end{pmatrix} = \begin{pmatrix} 1.0 & 0.0 & 1.0 \\ 0.0 & 1.0 & 0.0 \\ 0.0 & 0.0 & 1.0 \end{pmatrix} = \begin{pmatrix} R_{in} \\ G_{in} \\ B_{in} \end{pmatrix} \quad (3)$$

Further, photo image generally has a larger color gamut and a higher chroma than screened halftone image. Therefore, in case of photo image, when input color correction is performed using the matrix coefficient corresponding to screened halftone image, tone saturation could occur.

For this reason, it is necessary to perform input color correction using a matrix coefficient such that chroma is reduced and the tone saturation does not occur.

In the case where the type of original image is photo image, that is, in response to receipt of the image type distinguishing signal corresponding to photo image, the control section 25 reads out the matrix coefficient corresponding to photo image from the matrix coefficient storage section 26 and causes the input color correction section 24 to store the matrix coefficient therein. In this case, the input color correction section 24 performs input color correction using this newly stored matrix coefficient corresponding to photo image. The input color correction at this time is expressed by the following equation (4):

$$\begin{pmatrix} R_0 \\ G_0 \\ B_0 \end{pmatrix} = \begin{pmatrix} 0.96 & 0.02 & 0.02 \\ 0.02 & 0.96 & 0.02 \\ 0.02 & 0.02 & 0.96 \end{pmatrix} = \begin{pmatrix} R_{in} \\ G_{in} \\ B_{in} \end{pmatrix} \quad (4)$$

Further, unlike an original of photograph, an original of text has little continuous tones. In addition, in the case of an original of text, highlighting is preferable in most cases like the case of making graphs. Here, text on the original includes colored characters, characters in a presentation mode, etc.

In the case where the type of original image is text, that is, in response to receipt of the image type distinguishing signal corresponding to text, the control section 25 reads out the matrix coefficient corresponding to text from the matrix coefficient storage section 26 and causes the input color correction section 24 to store the matrix coefficient therein. In this case, the input color correction section 24 performs input color correction using this newly stored matrix coefficient corresponding to text. The input color correction at this time is expressed by the following equation (5):

$$\begin{pmatrix} R_0 \\ G_0 \\ B_0 \end{pmatrix} = \begin{pmatrix} 1.02 & -0.01 & -0.01 \\ -0.01 & 1.02 & -0.01 \\ -0.01 & -0.01 & 1.02 \end{pmatrix} = \begin{pmatrix} R_{in} \\ G_{in} \\ B_{in} \end{pmatrix} \quad (5)$$

Thus, the input correction section 6 corrects the strength of input signals (signals for color components in the image data of the supplied image) using a matrix coefficient. This makes it possible to reduce (compress) chroma or to change the amount of enhancement or the amount of hue control, in accordance with the characteristics of original image.

Note that, the matrix coefficient is not limited to 3×3 matrix coefficient. For example, 3×4 matrix coefficient, 3×9 matrix coefficient, or others may be adopted in accordance with a desired correction accuracy in the input color correction.

Also, the above matrix coefficient may be read out by the input color correction section 24. In this case, a signal indicating a leading address of the memory in which the matrix coefficient to be read out is stored is inputted from the control section 25 to the matrix coefficient storage section 26.

The above-described input color correction will be explained below with reference to a flowchart shown in FIG. 3.

The following description will assume that the matrix coefficient corresponding to screened halftone image is set as a default, as in the above case.

Figure 3:
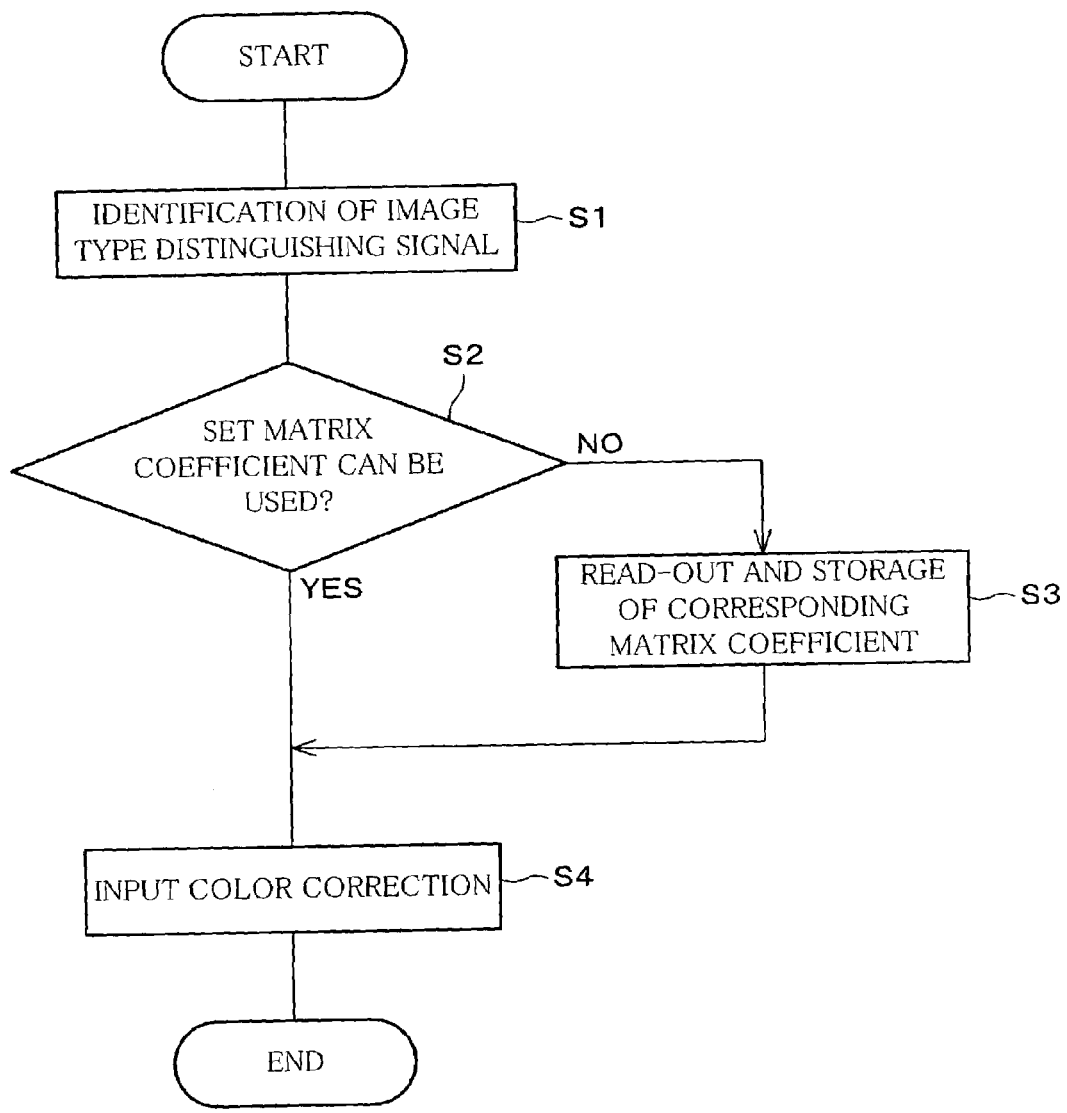
FIG. 3 is a flowchart showing input color correction in the input correction section.

As shown in FIG. 3, in response to receipt of an image type distinguishing signal, the control section 25 identifies which type of original image the image type distinguishing signal corresponds to (step S1).

Then, in the case where it is identified that the supplied image type distinguishing signal corresponds to the preset type of original image, i.e. screened halftone image in this case (YES in step S2), input color correction is performed using the matrix coefficient as it is set in the input color correction section 24 (step S4).

On the other hand, in the case where it is identified that the inputted image type distinguishing signal does not correspond to screened halftone image (NO in step S2), the control section 25 reads out a matrix coefficient corresponding to the supplied image type distinguishing signal and sets (causes to store) it in the input color correction section 24 (step S3).

The input color correction section 24 performs input color correction using the newly set matrix coefficient (step S4).

Incidentally, the type of color material (ink, toner, etc. used for the formation of images on a recording material) varies, for example, depending on a manufacturer or an image output device to be used.

For example, the type of color material used for supplied images varies depending on whether the image output device used for the formation of images supplied to the image processing device 1 is an electro photographic or ink-jet image output device, or a sublimatic printer. In other words, depending on an image output device used for the formation of images, the size of color gamut for the images varies. Therefore, in the case where different kinds of image output devices are used for the formation of supplied images, scanning errors tend to occur when the images are scanned as image data.

In view of this, the above-described matrix coefficient may be further changed in accordance with the types of color material used for the supplied image.

Here, it is assumed that this digital color copying machine further includes image modes indicating the type of original image as follows: mode of using electrophotographic process (electrophotographic mode), mode of using ink jet (ink-jet mode), and mode of using sublimatic printer (sublimatic mode). In this case, a suitable image mode is inputted from the operation panel 4, as in the above case.

Generally, an original (image) outputted (provided) on a sublimatic printer has a high chroma. Therefore, an electrophotographic or ink-jet image output device cannot express the colors of images as sufficiently as a sublimatic printer.

In view of this, in the case of a sublimatic mode, such a matrix coefficient that reduces chroma is used as in the case of the photo image mode. In other words, in the case of a sublimatic mode, it can be set to use the matrix coefficient which is used in the photo image mode.

Further, a comparison of the size of color gamut in these modes is usually expressed as follows:

sublimatic mode>ink-jet mode>electrophotographic mode.

For example, in the case of ink-jet mode, a matrix coefficient such that chroma is reduced (a chroma compression rate is decreased) less than that of sublimatic mode should be used. In the case of electrophotographic mode, such a matrix coefficient such that chroma is reduced less than that of ink-jet mode should be used.

Note that, a color material can vary depending on its manufacturer, so that a matrix coefficient may be changed in accordance with manufacturers.

For example, in the case of an original on which images are formed in the ink-jet mode, a matrix coefficient may be changed by the control section 25 to perform color correction as expressed by the following equation (6):

$$\begin{pmatrix} R_0 \\ G_0 \\ B_0 \end{pmatrix} = \begin{pmatrix} 0.98 & 0.01 & 0.01 \\ 0.01 & 0.98 & 0.01 \\ 0.01 & 0.01 & 0.98 \end{pmatrix} = \begin{pmatrix} R_{in} \\ G_{in} \\ B_{in} \end{pmatrix} \quad (6)$$

This makes it possible to perform suitable input color correction in accordance with a color material making up supplied images, i.e. a color material used for the formation of supplied images. Therefore, images with more excellent image quality can be provided on a recording material.

As described above, input color correction corresponding to the type of image is performed using a matrix coefficient corresponding to the type of image, so that it is not necessary to provide the color correction section 10 for performing color conversion separately for each type of image.

More specifically, the color correction section 10 should set any one of the foregoing original image modes as a default and hold a color correction table (Look-Up Table; LUT) corresponding to that original image mode.

In recent years, in the case where the image data supplied from the color image input device 2 are outputted on the color image output device 3, a mainstream image processing device has been a device which performs color correction of image data using a color correction table in the color correction section 10 of the image processing device 1.

For example, assuming that this digital color copying machine is arranged so as to support text image, screened halftone image (screen dots), and photo image (photograph) as the type of original image, in the case where the color correction section 10 performs color correction by direct conversion, the amount of data in a color correction table is $2^{24} \times 3$ (colors)=50331648 (byte), and the amount of data of matrix coefficients in the input correction section 6 is 9×3 (colors)=27 (byte). Thus, a total amount of data necessary in a memory is approximately 48 (Mbyte).

Here, a comparative example is given by an arrangement in which color correction tables in accordance with the types of original image are held in the color correction processing section 10 without matrix coefficients in accordance with the types of original image in the input correction section 6.

In this comparative example, the amount of data of color correction table is $2^{24} \times 3$(colors)×3(type)=150994944 (byte). Therefore, a total amount of data necessary in a memory is 144 (Mbyte).

Thus, the input correction section 6 performs the foregoing input color correction, so that it is not necessary to provide a plurality of color correction tables in accordance with the types of image in the color correction section 10.

In other words, providing only one color correction table corresponding to any one of types of images makes it possible to perform suitable color correction (color conversion) regardless of the type of image. Further, providing at least one color correction table allows an excellent accuracy of conversion from $R_0$, $G_0$, $B_0$ signals to C'M'Y' signals.

Therefore, an image with excellent image quality can be provided on a recording material.

Further, it is not necessary to create a color correction table for each type of image as described above, thereby reducing a necessary storage capacity. This allows the increase in performance and the reduction of manufacturing cost in the image processing device 1.

Second Embodiment

Figure 4:
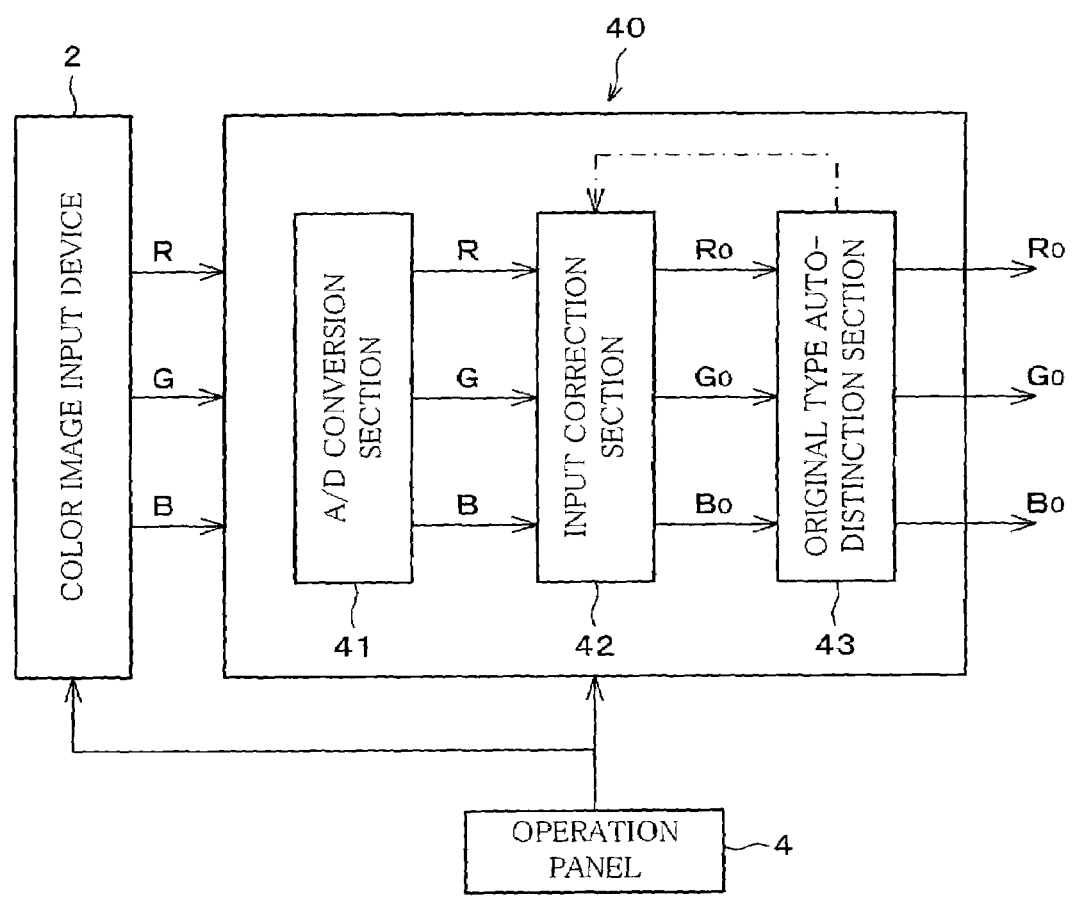
FIG. 4 is a block diagram showing a constitution of relevant part in a color image input device of an image scanning device and an image processing device according to another embodiment of the present invention.
Figure 5:
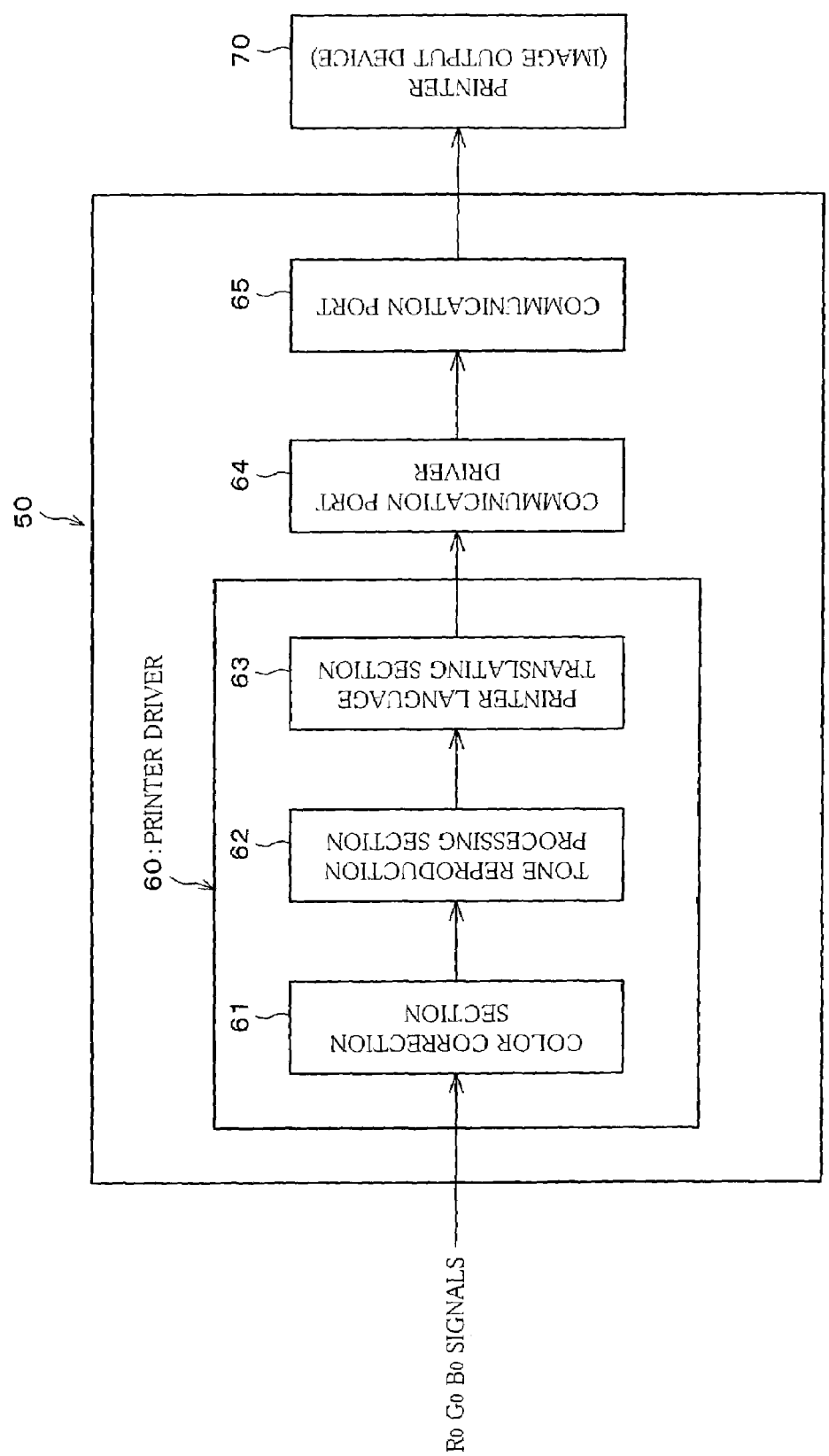
FIG. 5 is a block diagram showing a constitution of relevant part in a computer to which image data from the image processing device shown in FIG. 4 is supplied and a printer.

Referring to FIGS. 4 and 5, another embodiment of the present invention will be explained below. Note that, members having the same functions as those described in the First Embodiment are given the same reference numerals and explanations thereof are omitted here.

As shown in FIG. 4, an image processing device 40 includes an A/D (analog/digital) conversion section 41, an input correction section 42, and an original type auto-distinction section (original type distinguishing means) 43. The image processing device 40 and the color image input device 2 constitute an image scanning device. The A/D conversion section 41, input correction section 42, original type auto-distinction section 43 correspond to the A/D conversion section 5, the input correction section 6, the original type auto-distinction section 7 described in the First Embodiment, respectively, and they have the same arrangement and functions as those described in the First Embodiment.

Specifically, the input correction section 42, as in the input correction section 6 in the First Embodiment, performs input correction using different matrix coefficients depending on the type of original image, so as to convert RGB signals into $R_0$, $G_0$, $B_0$ signals. Also in this case, the original type auto-distinction section 43 is not always necessary as described in the First Embodiment. An image mode may be inputted from the operation panel 4 provided in the image scanning device.

The $R_0$, $G_0$, $B_0$ signals obtained by input color correction in the input correction section 42 is supplied via the computer 50 to a printer 70, as shown in FIG. 5. The printer 70 provides images on a sheet of paper (recording material) in accordance with the signals outputted from the computer 50.

This makes it possible to change the matrix coefficient in accordance with the types of image regardless of the value of signals for color components (RGB signals) in image data of an image supplied to the image processing device 40. Therefore, it is possible to perform input color correction in accordance with the types of image.

As shown in FIG. 5, the computer 50 includes a printer driver 60, a communication port driver 64, and a communication port 65. Further, the printer driver 60 includes a color correction section 61, a tone reproduction processing section 62, and a printer language translating section 63.

The printer driver 60 processes image data ($R_0$, $G_0$, $B_0$ signals) from the image processing device 40 using the color correction section 61 and tone reproduction processing section 62. Here, the color correction section 61 performs color correction as performed by the color correction section 10 in the First Embodiment (color conversion carried out by removing turbidity based on spectral characteristic of C•M•Y colors, including unnecessary absorption elements), and performs black generation and undercolor removal as performed by the black generation and undercolor removing section 11 in the First Embodiment. Further, the tone reproduction processing section 62 has the same arrangement and functions as those of the tone reproduction processing section 14 in the First Embodiment. The image data processed in the color correction section 61 and the tone reproduction processing section 62 are converted into data in the form of printer language in the printer language translating section 63. Thereafter, the converted data is supplied to the electrophotographic or ink-jet printer 70 via the communication port driver 64 and the communication port (RS232C, LAN, etc.) 65. The printer 70 may be a digital multifunctional printer having copy and fax functions, in addition to a printer function.

Note that, the type of image can be changed by processing its image data captured by the computer 50 (for example, by pasting photograph data to text data), so that the image data processed (edited) may be subjected to image processing using the above matrix coefficient, as an application software.

The same advantageous effects of the image processing devices 1 and 40 in the First and Second Embodiments can be obtained by recording a program for performing an image processing method on a computer-readable recording medium having a computer-implemented program recorded thereon. As a result of this, it is possible to provide a portable recording medium having a program for performing an image processing method.

Besides, for the above recording medium, a memory (not shown) to be handled on a micro computer, for example, something like ROM may be a program medium. Alternatively, the recording medium may be a program medium which is readable by a program reading device (not shown) when the medium is inserted to the program reading device, assuming that program reading device is provided as external memory device, for example.

Either case may have an arrangement in which a micro processor makes an access to a stored program to execute it, or a mode in which when a program is read out, the read program is downloaded to a program-storage area (not shown) in the micro computer and executed. A program for downloading should be stored beforehand in a main device.

Here, the program media, which is a recording medium that can be separated from a main unit, may be a medium fixedly holding a program, including tape media including magnetic tape, cassette tape, etc.; disk media including magnetic disk such as floppy® (disk, hard disk, etc. and optical disk such as CD-ROM (Compact Disc Read Only Memory), MO (Magneto Optical), MD (Mini-Disc), and DVD (Digital Versatile Disc); card media including IC card (including memory card) and optical card; and a semiconductor memory including mask ROM, EPROM (Erasable Programmable Read Only Memory), EEPROM (Electrically Erasable Programmable Read Only Memory), flash ROM, etc.

The First and Second embodiments have a system configuration in which the connection to a communication network including the Internet is possible, so that a medium may be one that holds a program fluidly in such a manner that a program is downloaded over the communication network. Note that, in the case where a program is downloaded from the communication network in such a manner, a program for use in downloading may be stored beforehand in a main device or installed from a separate recording medium.

When a program on the recording medium is read out by the program reading device provided in a digital color image forming device and computer system, the foregoing image processing method is performed.

A computer system consists of an image reading device such as flatbed scanner, film scanner, and digital camera; a computer on which a predetermined program is loaded so that various processes such as the image processing method are performed; an image display device, such as CRT display and liquid crystal display, which displays a processing result by the computer; and a printer which outputs the processing result by the computer onto a sheet of paper, etc. (recording material). Further, a modem and others are provided as communicating means for connecting a server and others via the network.

The image processing device of the present invention, as described above, includes:

input color correcting means for, using a matrix coefficient, performing input color correction for correcting strength of signals for color components in image data of a supplied image;

matrix coefficient storing means for storing a plurality of matrix coefficients in accordance with types of image; and control means for reading a matrix coefficient corresponding to a type of a supplied image out of the matrix coefficients stored in the matrix coefficient storing means and setting the matrix coefficient that has been read in the input color correcting means.

This makes it possible to change the matrix coefficient in accordance with the types of image, regardless of the value of signals for color components in the image data of the supplied image. Therefore, it is possible to perform suitable input color correction in accordance with the types of image.

Further, input color correction is performed using a matrix coefficient having a small storage capacity, so that, for example, it is not necessary to use an LUT (Look-Up Table) having a large storage capacity for each type of image when color conversion (process for converting color components into different color components) is performed later. Therefore it is possible to reduce a storage capacity.

In the above image processing device, it is preferable that the type of image is at least any one of text, screen dots, and photograph.

According to the above arrangement, it is possible to perform input color correction in accordance with each type of image, for example, such as text, screen dots (screened halftone image), photograph (photo image), or mixture of the foregoing elements.

The above image processing device preferably includes color converting means for, using a look-up table, converting first image data into second image data, the first image data being of a first color system composed of the color components in image data of the supplied image, the second image data being of second color system for providing an image on a recording material.

In recent years, in the case where the image data supplied from the image input device including a scanner or the like are outputted on the image output device such as printer, a mainstream image processing device has been a device which performs the color conversion of supplied image data using a LUT (Look-Up Table).

However, according to the above arrangement, input color correction is performed in accordance with the types of image in the input color correction section, so that it is not necessary to provide a plurality of LUTs in color converting means, in accordance with the types of image.

In other words, providing only one LUT corresponding to any one of types of images makes it possible to perform suitable conversion from first image data to second image data regardless of the type of image. Further, providing at least one LUT allows an excellent accuracy of conversion from the first image data to the second image data.

Therefore, an image with excellent image quality can be provided on a recording material.

Further, it is not necessary to create an LUT for each type of image as described above, thereby reducing a necessary storage capacity. This allows the increase in performance and the reduction of manufacturing cost in the image processing device.

In the above image processing device, it is preferable that the control means set a matrix coefficient in the input color correction means in accordance with the type of color material from which the supplied image is made.

Incidentally, the type of color material (ink or the like used for the formation of images on a recording material) varies, for example, depending on a manufacturer or an image output device to be used. Here, the image output device is a device which provides images on a recording material using a color material.

For example, the type of color material used for supplied images varies depending on whether the image output device used for the formation of images supplied to the image processing device 1 is an electrophotographic or ink-jet image output device, or a sublimatic printer. In other words, depending on an image output device used for the formation of images, the size of color gamut for the images varies. Therefore, in the case where different kinds of image output devices are used for the formation of supplied images, scanning errors tend to occur when the images are scanned as image data.

However, according to the above arrangement, it is possible to set a matrix coefficient corresponding to the type of color material.

This makes it possible to perform suitable input color correction in accordance with a color material making up supplied images, i.e. a color material used for the formation of supplied images. Therefore, images with more excellent image quality can be provided on a recording material.

The image forming device of the present invention includes the above-described image processing device and an image input device which scans images from an original and supplies the scanned images to the image processing device.

According to the above arrangement, the image processing device can perform suitable input color correction in accordance with the types of image with respect to image data of images supplied from the image input device. Therefore, it is possible to provide an image forming device which can form images with an excellent image quality.

Further, input color correction is performed using a matrix coefficient having a small storage capacity, so that, for example, it is not necessary to use an LUT (Look-Up Table) having a large storage capacity for each type of image when color conversion (process for converting color components into different color components) is performed after the input color correction in the image processing device. Therefore it is possible to reduce a storage capacity in the image forming device.

The image processing method of the present invention, as described above, is arranged to include the steps of:

selecting a matrix coefficient corresponding to a type of an supplied image from among a plurality of matrix coefficients; and using the matrix coefficient that has been selected, performing input color correction for correcting strength of signals for color components in image data of the supplied image.

According to the above arrangement, it is possible to change the matrix coefficient in accordance with the types of image, regardless of the value of signals for color components in the image data of the supplied image. Therefore, it is possible to perform suitable input color correction in accordance with the types of image.

Further, input color correction is performed using a matrix coefficient having a small storage capacity, so that, for example, it is not necessary to use an LUT (Look-Up Table) having a large storage capacity for each type of image when color conversion (process for converting color components into different color components) is performed later. Therefore it is possible to reduce a storage capacity.

In the above image processing method, it is preferable that the type of image is at least any one of text, screen dots, and photograph.

According to the above arrangement, it is possible to perform input color correction in accordance with each type of image, for example, such as text, screen dots (screened halftone image), photograph (photo image), or mixture of the foregoing elements.

The above image processing method preferably includes the step of:

performing color conversion for, using a look-up table, converting first image data into second image data, the first image data being of a first color system composed of the color components in image data of the supplied image and being obtained by the input color correction, the second image data being of second color system for providing an image on a recording material.

According to the above arrangement, image data is subjected to input color correction in accordance with the types of image, so that it is not necessary to provide a plurality of LUTs in accordance with the types of image.

In other words, providing only one LUT corresponding to any one of types of images makes it possible to perform suitable color conversion regardless of the type of image. Further, providing at least one LUT and performing color conversion using the LUT allows an excellent conversion accuracy in color conversion.

Further, it is not necessary to create an LUT for each type of image as described above, thereby reducing a storage capacity necessary for the process.

In the above image processing method, it is preferable that a matrix coefficient is selected in accordance with the type of color material from which the supplied image is made.

According to the above arrangement, it is possible to select a matrix coefficient in accordance with the type of color material.

This makes it possible to perform suitable input color correction depending on a color material composing supplied images, i.e. a color material used for the formation of supplied images. Therefore, it is possible to provide images with more excellent image quality.

The image processing program of the present invention is arranged to cause a computer to execute the foregoing image processing method.

According to the above arrangement, it is possible to provide the foregoing image processing method to users by loading the image processing program into a computer system.

The recording medium of the present invention is arranged to record an image processing program which causes a computer to execute the image processing method.

According to the above arrangement, it is possible to provide the foregoing image processing method to users by loading a program recorded in the foregoing recording medium into a computer system.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. An image processing device comprising:
    input color correcting means, using a matrix coefficient, for performing input color correction for correcting strength of signals for color components in image data of a first color system supplied from a supplied image of an original;
    matrix coefficient storing means for storing a plurality of matrix coefficients in accordance with different types of images, wherein the different types of images includes at least any one of text, screen dots, and photograph; and
    control means for reading a matrix coefficient corresponding to at least one image type out of the matrix coefficients stored in the matrix coefficient storing means, the at least one image type corresponding to the supplied image, and setting the matrix coefficient that has been read in the input color correcting means.

2. The image processing device according to claim 1, wherein the control means set a matrix coefficient in the input color correction means in accordance with types of color material from which the supplied image is made.

3. The image processing device according to claim 1, further comprising:
    color converting means for, using a look-up table, converting first image data into second image data, the first image data being of a first color system composed of the color components, the second image data being of second color system for providing an image on a recording material.

4. An image forming device comprising:
    an image processing device including:
        input color correcting means, using a matrix coefficient, for performing input color correction for correcting strength of signals for color components in image data of a first color system from a supplied image of an original;
        matrix coefficient storing means for storing a plurality of matrix coefficients in accordance with different types of images, wherein the different types of images includes at least any one of text, screen dots, and photograph; and
        control means for reading a matrix coefficient corresponding to at least one image type out of the matrix coefficients stored in the matrix coefficient storing means, the at least one image type corresponding to the supplied image, and setting the matrix coefficient that has been read in the input color correcting means, and
    an image input device which scans an image from an original and supplies an image that has been scanned to the image processing device.

5. The image forming device according to claim 4, wherein the image processing device further includes color converting means for, using a look-up table, converting first image data into second image data, the first image data being of a first color system composed of the color components, the second image data being of second color system for providing an image on a recording material.

6. The image forming device according to claim 4, wherein the control means set a matrix coefficient in the input color correction means in accordance with types of color material from which the supplied image is made.

7. A computer-readable recording medium for storing an image processing program that causes a computer to execute an image processing method comprising the steps of:
    selecting a matrix coefficient corresponding to a type of an supplied image from among a plurality of matrix coefficients, each of the plurality of matrix coefficients corresponding to a different type of image and wherein the different type of image includes at least any one of text, screen dots, and photograph; and
    using the matrix coefficient that has been selected, performing input color correction for correcting strength of signals for color components in image data of a first color system from the supplied image of an original.

8. The recording medium according to claim 7 wherein the image processing method further includes the step of:
    performing color conversion for, using a look-up table, converting first image data into second image data, the first image data being of a first color system composed of the color components and being obtained by the input color correction, the second image data being of second color system for providing an image on a recording material.

9. The recording medium according to claim 7, wherein in the image processing method, the matrix coefficient is selected in accordance with types of color material from which the supplied image is made.

10. An image processing method comprising the steps of:
    selecting a matrix coefficient corresponding to a type of a supplied image from among a plurality of matrix coefficients, each of the plurality of matrix coefficients corresponding to a different type of image and wherein the different type of image includes at least any one of text, screen dots, and photograph; and
    using the matrix coefficient that has been selected, performing input color correction for correcting strength of signals for color components in image data of a first color system from the supplied image of an original.

11. The image processing method according to claim 10, further comprising the step of:
    performing color conversion for, using a look-up table, converting first image data into second image data, the first image data being of a first color system composed of the color components and being obtained by the input color correction, the second image data being of second color system for providing an image on a recording material.

12. The image processing method according to claim 10, wherein the matrix coefficient is selected in accordance with types of color material from which the supplied image is made.

13. An image processing program in combination with a computer having a processor on which the image processing program is executed, the image processing program that causes a computer to execute an image processing method comprising the steps of:
    selecting a matrix coefficient corresponding to a type of a supplied image from among a plurality of matrix coefficients, each of the plurality of matrix coefficients corresponding to a different type of image and wherein the different type of image includes at least any one of text, screen dots, and photograph; and
    using the matrix coefficient that has been selected, performing input color correction for correcting strength of signals for color components in image data of a first color system from the supplied image of an original.

14. The image processing program according to claim 13, wherein in the image processing method, the matrix coefficient is selected in accordance with types of color material from which the supplied image is made.

15. The image processing program according to claim 13, wherein the image processing method further includes the step of:

performing color conversion for, using a look-up table, converting first image data into second image data, the first image data being of a first color system composed of the color components and being obtained by the input color correction, the second image data being of second color system for providing an image on a recording material.

* * * * *